(No Model.) 2 Sheets—Sheet 2.
B. F. STEWART.
BUTT ADJUSTER FOR GRAIN BINDERS.
No. 586,634. Patented July 20, 1897.
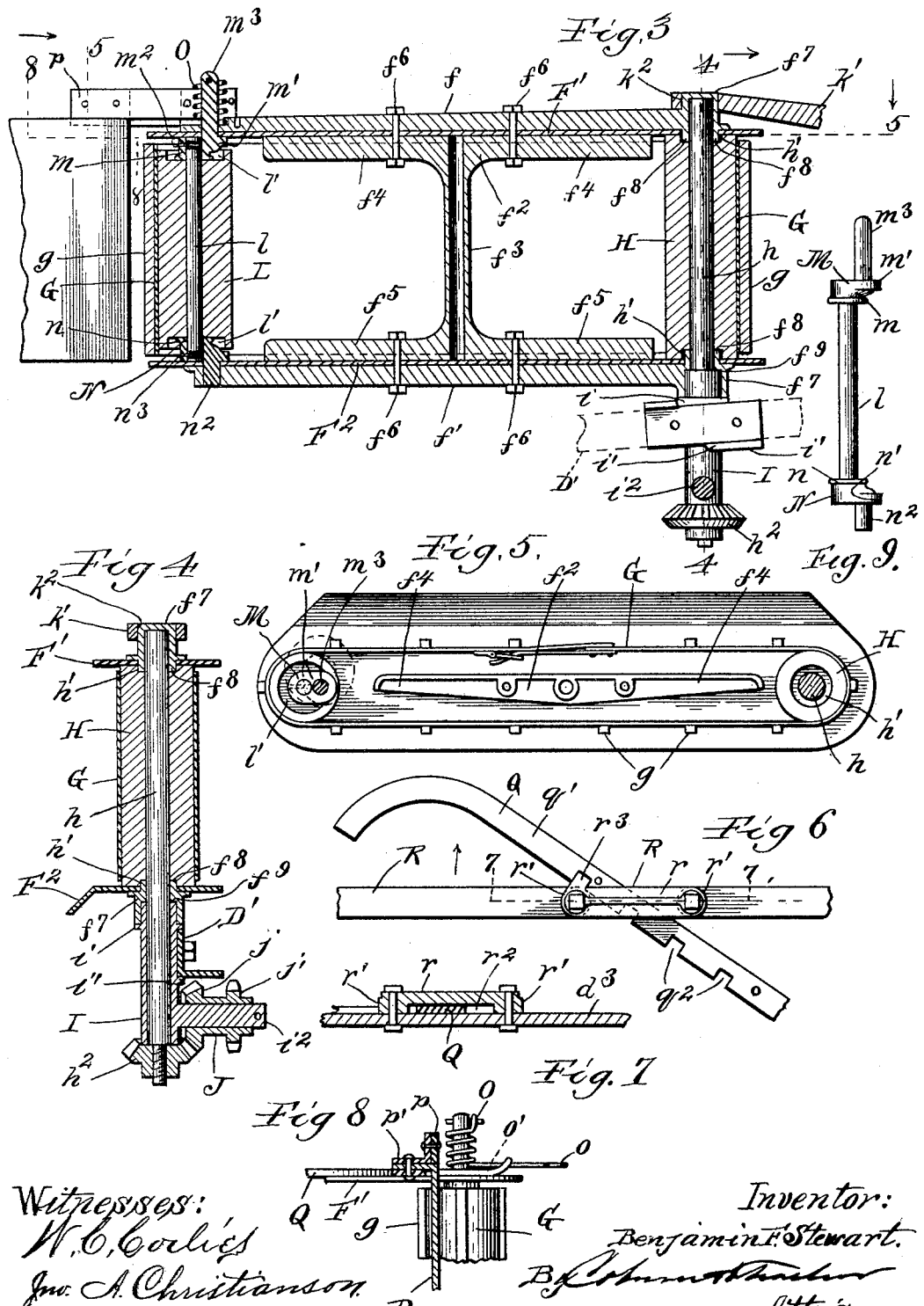
Witnesses:
W. C. Corliss
Jno. A. Christianson
Inventor:
Benjamin F. Stewart
Atty's

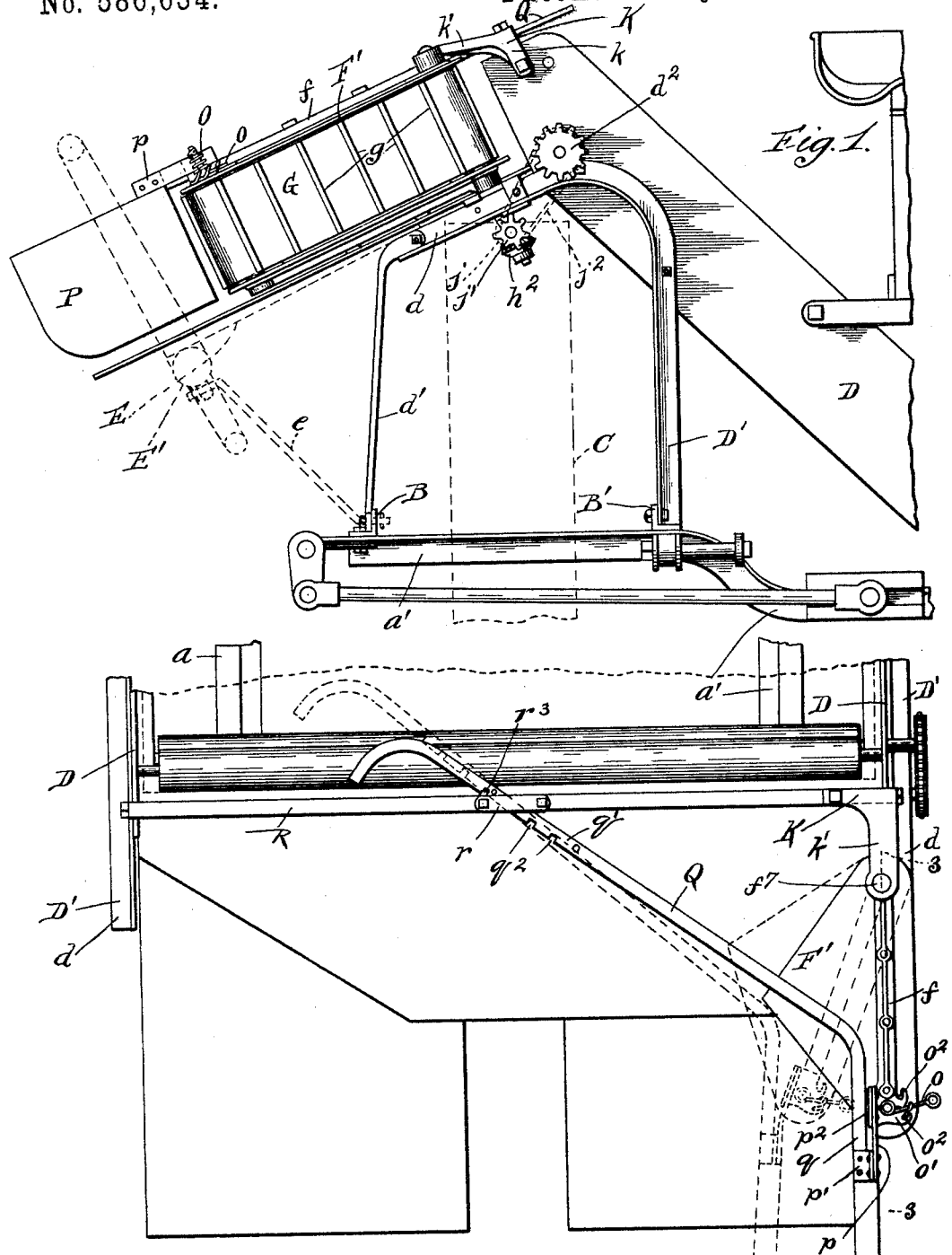

UNITED STATES PATENT OFFICE.

BENJAMIN F. STEWART, OF CHICAGO, ILLINOIS.

BUTT-ADJUSTER FOR GRAIN-BINDERS.

SPECIFICATION forming part of Letters Patent No. 586,634, dated July 20, 1897.

Application filed April 17, 1895. Serial No. 546,127. (No model.)

*To all whom it may concern:*

Be it known that I, BENJAMIN F. STEWART, a citizen of the United States, residing at Chicago, in the county of Cook and State of Illinois, have invented certain new and useful Improvements in Butt-Adjusters for Grain-Binders, which are fully set forth in the following specification, reference being had to the accompanying drawings, in which—

Figure 1 represents a front elevation of the outer or stubble end of a grain-binding harvester embodying my invention; Fig. 2, a plan view of the same; Fig. 3, a detail vertical section on the line 3 3 of Fig. 2; Fig. 4, a detail vertical section on the line 4 4 of Fig. 3; Fig. 5, a plan section of the same on the line 5 5 of Fig. 3; Fig. 6, a detail plan of the inner or free end of the adjusting-lever and its support; Fig. 7, a detail section on the line 7 7 of Fig. 6; Fig. 8, a detail section on the line 8 8 of Fig. 3, and Fig. 9 a detail elevation of the tightening crank-shaft at the outer end of the adjuster.

In the drawings, Figs. 1 and 2 are on one and the same scale. The remaining figures are also upon one and the same scale, but enlarged from that of the former.

The present invention relates to that device in grain-harvesting machines which is generally known as the "butt-adjuster" and is in common use upon said class of machines.

The improvement consists in certain features of construction of the butt-adjuster itself, the means for mounting the same, and the mechanism for changing or adjusting the position of the butt-adjuster with reference to the binder.

A description in detail of the construction and operation of the butt-adjuster mechanism, in connection with brief reference to such other parts of the machine as may be necessary for an understanding of the present improvements, will now be given, and the particular improvements which are believed to be new and which it is desired to secure by Letters Patent will then be defined more distinctly in claims.

Only a very few of the main parts of a grain-harvesting machine are necessary to be shown and described in this case, as they have no real active connection with the mechanism to which the invention relates. A small portion only of the general construction of the machine is shown in the drawings, and most of these are simply for the purpose of illustrating the construction and operation of the butt-adjuster mechanism in connection with the adjacent parts of the machine.

In the drawings, A represents the platform, whose front and rear sills $a\ a'$, respectively, are extended outward beyond the main wheel in front and rear thereof. These extensions are connected together by cross-bars B B', and the main or ground wheel C is mounted between the said bars. The elevator-frame D may be of any ordinary construction and is supported at its upper end by standards D', bent outward and downward to form a nearly horizontal section $d$ at their upper ends, to the front one of which is secured one end of a brace-rod $d'$, the other or lower end of which is fastened to the outer cross-bar. These parts just mentioned are not essential features of the present invention and constitute a part of the subject-matter of another application of mine filed of even date herewith. The binder-incline E is mounted as usual and extends from the upper end of the elevator downward and outward to the binding mechanism, a few parts of which are indicated in Fig. 1 by dotted lines, E' being the large tubular rod, which is the main carrier of the binder and is supported by brace-bars $e$, standing between it and the outer cross-bar. Further reference to the binding mechanism is not here necessary.

The frame F of the butt-adjuster consists of two long beams or bars $f f'$, the first letter indicating the upper and the second the lower beam. The length of these beams is about the same as the required length of the complete butt-adjuster, and between them is placed a kind of central body or support $f^2$ of I form substantially, being constructed with a single upright $f^3$, at the upper end of which are arms $f^4$, extending horizontally from opposite sides of the standard and at right angles thereto. Similar arms $f^5$ are projected in like manner from the lower end of the upright, being practically parallel with the latter. These arms are of extraordinary length for a regular I-shaped device, this extension being given because they constitute the main support for the said beams and extend along on the inside of each of the latter nearly the entire space between the two rollers of the adjuster-apron. The beams and the said cross-heads of the center frame are firmly secured together by through-bolts $f^6$; but before this is done thin metallic plates or strips $F'$ $F^2$ are arranged between the members of each pair of the said devices, the fastening-bolts also passing through these respective plates or strips. $F'$ marks the upper and $F^2$ the lower plate. Each of the beams is enlarged at its inner or upper end to provide a bearing for the driving-roller shaft of the apron, these enlargements being indicated by $f^7$, and on the inside of each there is a circular or annular flange $f^8$, which extends the journal-bearing inward somewhat and provides a protection for certain purposes, which will be hereinafter explained. The metal plates secured between the beams and cross-heads, as described, project beyond said beams at each side or edge thereof, the inner or rear projection being somewhat wider than that at the front. They thus furnish protection for the apron and also a partially-inclosed space for the grain-butts. The apron G of the adjuster is of ordinary construction and preferably provided with cross-slats $g$. The driving-roller H for this apron is fixed on a drive-shaft $h$ and is provided at each end with a circular recess $h'$, adapted to receive, respectively, the annular flanges projecting inward at the upper ends of the beams, as seen in Figs. 3 and 4. The stationary bearings of the drive-shaft are thus extended inward a little beyond the respective ends of the roller and are surrounded by the outer rims or end edges of this roller. This feature of construction is for the purpose of preventing the grain-straw from coming in contact with the revoluble shaft, as is the result in most butt-adjusters, and when there is no such protection straws will often pass into contact with the said shaft and be gradually wound thereon, thereby interfering with its revolution and sometimes actually clogging its action. With the protecting device just described this result is entirely prevented. The journal-bearing in the upper beam for the upper end of the drive-shaft does not extend entirely through the enlargement on the beam, but is a kind of socket. The corresponding bearing in the lower beam does extend through, but is stepped to make a kind of stop $f^9$, which is seated and rests upon the upper end of a short tube I, applied to the lower projecting end of the drive-shaft and forming a part of its bearing. This tube is seated in and secured to the projecting arm of the front standard D'. Just below the edge of the outer bearing projection on the lower beam this tube is provided with a narrow circumferential flange $i$, upon which the outer edge of the said beam-bearing rests as a support. A short distance below this flange there is on the inside of the tube a short lug or projection $i'$, the space between which and the flange above is substantially the same as the width of the vertical web of the angle-iron standard D', and the tube is secured thereto by a short pin passing through said web and fastened on the other side thereof by a nut, so that the tube is fixed. The ends of the driving-roller, which is fixed on the drive-shaft, keep the upright drive-shaft in position by their abutment against the inner faces of the plates $F'$ and $F^2$, respectively. The bearing-tube I is provided with a journal-pin $i^2$ very near its lower end and below the support to which the tube is secured. This pin projects forward from the machine and makes a journal-bearing for a short tubular shaft J, which is mounted loosely thereon and is provided at its inner end with a small bevel-pinion $j$ and near its outer end with a toothed or sprocket pinion $j'$, by means of which it may be rotated on the journal-pin. A somewhat similar bevel gear-pinion $h^2$ is fastened to the lower end of the drive-shaft immediately below the fixed tubular bearing and engaged with the bevel gear-pinion on the short tubular shaft, the latter being driven by a short chain $j^2$, running over the sprocket-pinion and a like but somewhat larger pinion $d^2$ on the driving-shaft of one of the elevator-aprons at the upper end of the elevator-frame. The support for the upper portion of the adjuster-frame is a bracket K, consisting of a short head $k$, which is fastened to the upper end of the front side of the elevator-frame, and a cross-bar running across the upper end of the elevator-frame and secured to the respective sides thereof. The other member of this bracket is a long arm $k'$, extending outward and slightly downward over the upper edge of the binder-incline and enlarged slightly at its outer end, which is provided with an aperture $k^2$, in which the upper or outward projection at the inner end of the upper frame-beam is journaled, as shown in the drawings.

The apron-roller L at the outer or lower end of the adjuster-frame is mounted loosely on a carrying shaft or journal $l$, which is fixed—that is, it is not revoluble, though its supports may be adjusted, as will be presently described. This roller is also provided with recesses $l'$ in its respective ends and corresponding to the recesses in the ends of the upper or driving roller, except that they are of greater diameter. This shaft or journal for the outer apron-roller is mounted in the frame by certain devices of crank form, which may be called "crank-arms" or "brackets."

The crank M for the upper end of the journal $l$ is made with a head $m$, substantially circular in form, though having a projection $m'$ at one side and adapted to set into the recess in the upper end of the lower roller. It is perforated for the reception of the upper end of the shaft and is secured to the latter by a pin or bolt $m^2$, so that both will move together. A pin $m^3$ rises from the upper surface of this head and eccentric to the perforation therein, being set out on the projection, as seen in Figs. 3 and 9. This crank-pin is set up through suitable apertures in the lower ends of the upper beam and plate. A like crank device N is secured in like manner to the lower end of the said journal-shaft, being constructed with a like head $n$, which is adapted to set into the recess in the lower end of the roller and is perforated to fit upon the lower end of the journal-shaft, being secured thereto by a pin or bolt. The side enlargement $n'$ of this head is like the one above, and a crank-pin $n^2$ extends outward or downward from this enlargement, the same as the crank-pin at the other end, except that it is much shorter and just passes through suitable bearing-apertures in the lower beam and plate. This makes a kind of double-crank shaft of the bearing-journal, as seen in Fig. 9. The upper crank-arm, however, is considerably longer than the lower one and projects upward or outward some distance above its bearings, as seen in Figs. 1, 3, and 8. The pin or bolt which secures the lower crank to the shaft is marked $n^3$ in Fig. 3.

A spring O is fastened at one end to the upper end of the projecting crank-arm $m^3$, thence is coiled down and around the latter and its lower free end projected outward to form a horizontal arm $o$, extending outward or to the front of the machine, as seen in Figs. 2 and 8. At the lower end of the upper beam $f$ there is an enlargement $o'$, extending somewhat beyond each edge of the beam and provided at its outer or front edge with a series of curved notches $o^2$. The horizontal arm of the spring extends out over this notched edge and may be engaged with any one of the notches. Obviously the tension of this spring will act to turn the cranked bearing-shaft in such direction as to throw it outward, thereby thrusting the lower roller against the apron and so keeping the latter taut. The tension of this spring which actuates the cranked roller-shaft $l$ may be adjusted and regulated by changing the spring-arm from one notch to another in the toothed edge with which it engages.

At the lower end of the apron-frame there is arranged what may be called an "extension-piece" P, which is of the same width or height as the adjuster-frame and a little longer than its width. This supplemental piece may be called a "plate," and it is secured to the adjuster-frame by means of a strap-spring $p$, which is fastened to the upper inner corner of the plate at one end and extended thence inward and secured at its other end to the adjuster-frame. The attachment of this spring to the plate is by means of a short piece of angle-iron $p'$, secured to the corner of the plate mentioned above, and the fastening of the other end to the adjuster-frame is by means of a short upright flange $p^2$ on the lower enlarged end of the upper beam, as seen in Figs. 1, 2, 3, and 8. This connecting-spring is bent slightly, so that in normal position the lower or lever end will stand outward or forward somewhat beyond the upper end, as seen in dotted lines in Fig. 2.

An adjusting or controlling lever Q is attached at one end to the supplemental plate P. This lever is long and is bent near its outer lower end at an obtuse angle, forming a short section $q$ at this end, which is fastened to the upper end of the supplemental plate and stands in line therewith. The longer lever-section $q'$ extends rearward and upward from the bend to a bar R, secured to the upper end of the elevator-frame and arranged transversely thereof. A loop or opening running lengthwise of this bar is provided near the center of the latter for the reception of the free end of the adjuster-lever. As seen in the drawings, this device is obtained by means of a short metal clip $r$, provided at each end with a slight enlargement $r'$ on the same side or face thereof. This clip is bolted to the upper side of the transverse bar, and obviously there will thus be provided quite a long opening or passage $r^2$ between the central portion of the clip and the face of the transverse bar, as seen in Fig. 7. At the rear end of the clip there is a short stud or projection $r^3$, extending upward from the upper edge of the latter and inclined slightly forward, as seen in Figs. 2 and 6. The free end of the controlling-lever passes through the looped space and is provided with a series of notches $q^2$, which are adapted to engage with this stud on the clip, as indicated in Figs. 2 and 6. By this means the adjuster can be secured in any position desired, and the adjusting-lever will always be held in the connection which is made with the clip-stud by the tension of the connecting-spring between the adjuster-frame and the supplemental plate. Whatever may be the position of the butt-adjuster the said connecting-spring is under tension by more or less of a backward pull upon its bend. The outer or lower end of this spring will therefore have a tendency to throw the supplemental plate forward, and obviously this will have the effect upon the bent lever to keep its free notched end in engagement with the fastening-stud, as indicated in Fig. 2. If it is desired to swing the butt-adjuster outward or forward to the extreme front end of the binder-incline to accommodate the longest grain, the controlling-lever is released and thrust in this direction, bringing the parts into the position shown in full lines in Fig. 2, and is then engaged with the locking-stud in its outer notch. In this adjustment the supplemental plate and the adjuster-frame are about in a straight line, and the connecting-spring is also about straight, as indicated by full lines in said Fig. 2, and the tension of the spring will thus be increased, which will have the effect to engage the notched end of the controlling-lever with the fastening-stud with increased force. When the adjustment is inward or backward for shorter grain, the connecting-spring assumes its normal bend to a greater or less extent, as indicated in dotted lines in the same figure; but sufficient tension always remains in the ordinary changes in the position of the butt-adjuster for different lengths of grain to cause the notched end of the controlling-lever to engage the locking-stud with some one of its notches and hold it in this locked position with sufficient force to hold the lever in this engagement in all ordinary work. The combined action of the butt-adjuster, supplemental plate, spring connection between the two, and the adjusting or controlling lever is such that the said connecting-spring will keep the plate substantially at a right angle to the binder-incline and the grain passing over the latter whatever may be the position to which the device is adjusted. This will be seen in Fig. 2, in which the two positions of the said plate, one in full lines and the other in dotted lines, are substantially parallel.

The function and operation of the different parts of the present invention have been pointed out as their construction and organization have been described. It is not necessary, therefore, to repeat these statements in a single paragraph combining all of them. It will be understood that mechanical changes may be made in some parts of the mechanism herein described and shown and constituting the invention of the present case, and such mechanical changes I contemplate as within the invention as it may be applied to different machines.

Having thus described my invention, what I claim to be new, and desire to secure by Letters Patent, is—

1. In a harvester butt-adjuster frame, a central, I-shaped, metallic body having cross-heads extended on both sides of the upright, in combination with metallic beams arranged lengthwise of the body cross-heads, respectively secured thereto, and extending beyond their respective ends, apron-rollers mounted respectively in the said projecting ends of the beams, and metallic plates arranged between the beams and cross-heads respectively and extending beyond the latter on each side, but with greater width at the inside or rear of the adjuster, and with ends projecting as far as or a little beyond the ends of the beams, substantially as described.

2. In a harvester butt-adjuster frame, the upper and lower longitudinal beams provided at their upper or inner ends with journal-bearings for the driving-roller shaft, in combination with a driving-shaft, to which the apron drive-roller is secured, journaled in the inner ends of said beams and at its lower end extending through and considerably below the journal-bearing, a short tube fitted to the lower projecting end of said shaft, secured to a suitable support on the upright frame of the harvester and provided with a narrow circular flange near its upper end and a journal-pin near its lower end, a bracket-arm secured at one end to the upper portion of the elevator-frame and at its outer end journaled to the outer portion of the enlarged end of the upper frame-beam, gearing journaled on the pin projecting from the said tube, and a gear secured to the lower end of the driving-shaft and engaging with the driving-gear on the pin, substantially as described.

3. In a harvester butt-adjuster frame, the upper and lower beams of the supporting-frame, with outward enlargements or projections at their inner ends, both of which are recessed or perforated for journal-bearings, with the lower one cut out or recessed around the outer portion of this bearing, in combination with a tubular journal-bearing adapted at one end to set into the said recess in the lower frame-beam, provided with a narrow annular flange near its upper end on which the outer edge of said beam-recess is seated, and at a little distance below the same with a projecting lug on the outside or front, an angle-iron support, the upright web of which fits the space between the said two projections on the tubular bearing and is secured thereto by any suitable fixed connection, and the driving-shaft of the driving-roller, journaled in the inner ends of the said beams and passing down through said tube as an extension-bearing, substantially as described.

4. In a harvester butt-adjuster frame, the upper and lower beams of the supporting-frame, in combination with a shaft at the outer or lower ends thereof, crank devices having circular bodies rigidly secured to the respective ends of the shaft, each extending inward a little way thereon, crank-arms journaled respectively in the ends of the beams, and an outer or lower apron-roller mounted loosely on said shaft and provided with circular recesses in each end, larger in dimension than the crank-heads and adapted to receive the latter when mounted in position, substantially as described.

5. In a harvester butt-adjuster frame, a main or supporting frame jointed at its upper end to suitable supports on which it is free to swing, in combination with a supplemental plate at the lower or outer end of said frame and standing a little distance beyond the latter, a strap-spring connecting the upper inner corner of the plate with the lower end of the upper beam, being attached at its ends to the said parts respectively and having its lower or outer end bent forward slightly when in normal position, a controlling or adjusting lever secured at one end to the said plate, and mechanism for securing said lever at different points of adjustment, substantially as described.

6. In a harvester butt-adjuster, the upper and lower beams of the supporting-frame; a shaft in the outer or lower ends thereof; crank devices, having disk-shaped bodies secured to the respective ends of the shaft, and extending inward a little way thereon; crank-arms journaled respectively in the ends of the beams; an outer or lower apron-roller mounted loosely on such shaft, and provided with a circular recess at each end, adapted to receive the crank-disks; a coiled spring surrounding and attached at one end to one of the crank-arms, and at the other end to the supporting-frame; and devices for adjusting the tension of the said spring, substantially as shown and described.

7. In a harvester butt-adjuster frame, a main or supporting frame jointed at its upper end to suitable supports on which it is free to swing, in combination with a supplemental plate at the lower or outer end of said frame and standing a little distance beyond the latter, a strap-spring connecting the upper inner corner of the plate with the lower end of the upper beam, being attached at its ends to the said parts respectively and having its lower or outer end bent forward slightly when in normal position, a controlling or adjusting lever bent at an obtuse angle and having its short section secured to said plate while the longer section extends backward at an inclination upward and is provided with a series of notches, and a grooved or channeled clip mounted on a suitable support between the upper ends of the elevator-frame and having a short stud or projection at its rear end adapted to engage with the notches in said lever, which passes through the said space or opening in the clip, substantially as described.

8. In a harvester butt-adjuster, the combination with the upper and lower metallic beams, of a shaft at the outer or lower ends thereof, an enlarged circular head keyed to each end of said shaft, a crank-arm projecting outward from each circular head and journaled respectively in the upper and lower metallic beams, and an outer or lower apron-roller loosely mounted on said shaft and provided with circular recesses in each end which are adapted to receive the circular heads when mounted in position, substantially as described.

9. In a harvester butt-adjuster, the combination with the upper and lower metallic beams, of a shaft at the outer or lower ends thereof, an enlarged circular head keyed to each end of said shaft and extending inward a little way thereon, a crank-arm projecting outward from each circular head and journaled respectively in the upper and lower beams, an outer or lower apron-roller loosely mounted on said shaft and provided with circular recesses in each end which are adapted to receive the circular heads when mounted in position, a coiled spring surrounding and attached at one end to one of the crank-arms and having its free end bent outward to form a horizontal arm, and a notched projection carried by one of the beams with which the said horizontal arm of the spring is made to engage whereby the position of the roller is changed, as and for the purpose described.

BENJAMIN F. STEWART.

Witnesses:
A. A. MURRAY,
I. A. HELMICH.